United States Patent
Song et al.

(10) Patent No.: US 12,044,799 B2
(45) Date of Patent: Jul. 23, 2024

(54) DEEP NEURAL NETWORK (DNN)-BASED MULTI-TARGET CONSTANT FALSE ALARM RATE (CFAR) DETECTION METHODS

(71) Applicants: ZHEJIANG UNIVERSITY, Zhejiang (CN); DONGHAI LABORATORY, Zhejiang (CN)

(72) Inventors: Chunyi Song, Zhoushan (CN); Zhihui Cao, Zhoushan (CN); Zhiwei Xu, Zhoushan (CN); Yuying Song, Zhoushan (CN); Fuyuan Ai, Zhoushan (CN); Jingxuan Wu, Zhoushan (CN)

(73) Assignees: ZHEJIANG UNIVERSITY, Zhoushan (CN); DONGHAI LABORATORY, Zhoushan (CN)

( * ) Notice: Subject to any disclaimer, the term of this patent is extended or adjusted under 35 U.S.C. 154(b) by 0 days.

(21) Appl. No.: 18/451,818

(22) Filed: Aug. 17, 2023

(65) Prior Publication Data
US 2024/0004032 A1   Jan. 4, 2024

Related U.S. Application Data

(63) Continuation-in-part of application No. PCT/CN2022/105025, filed on Jul. 12, 2022.

(30) Foreign Application Priority Data

Jul. 14, 2021 (CN) .......................... 202110793105.7

(51) Int. Cl.
*G01S 7/41* (2006.01)
*G01S 13/53* (2006.01)
(Continued)

(52) U.S. Cl.
CPC ............ *G01S 7/417* (2013.01); *G01S 13/536* (2013.01); *G01S 13/726* (2013.01); *G06N 3/084* (2013.01)

(58) Field of Classification Search
CPC ...... G01S 7/417; G01S 13/536; G01S 13/726; G06N 3/084
See application file for complete search history.

(56) References Cited

U.S. PATENT DOCUMENTS

| 2018/0136326 A1 | 5/2018 | Schuck et al. |
| 2022/0308163 A1 | 9/2022 | Song et al. |

FOREIGN PATENT DOCUMENTS

| CN | 104732243 A | 6/2015 |
| CN | 106228124 A | 12/2016 |

(Continued)

OTHER PUBLICATIONS

International Search Report in PCT/CN2022/105025 mailed on Oct. 14, 2022, 11 pages.

(Continued)

*Primary Examiner* — Timothy A Brainard
*Assistant Examiner* — Helena H Seraydaryan
(74) *Attorney, Agent, or Firm* — METIS IP LLC

(57) ABSTRACT

The embodiment of the present disclosure provides a deep neural network (DNN)-based multi-target constant false alarm rate (CFAR) detection method. The method includes: obtaining target values to be measured based on radar IF (IF) signals to be detected, the target values to be measured including a measured frequency value and a measured intensity value of the radar IF signals; obtaining peak sequences based on the target values to be measured; generating a target detection result by processing the peak sequences based on a DNN detector, the DNN detector being a machine learning model; generating approximated maximum likelihood estimation (AMLE) of a scale parameter based on an approximated maximum likelihood estimator; generating a false alarm adjustment threshold based on a preset false alarm rate and the AMLE; and generating a constant false alarm detection result by processing the target (Continued)

detection result based on the false alarm adjustment threshold.

5 Claims, 5 Drawing Sheets

(51) Int. Cl.
  *G01S 13/536* (2006.01)
  *G01S 13/72* (2006.01)
  *G06N 3/084* (2023.01)

(56) References Cited

FOREIGN PATENT DOCUMENTS

| | | | |
|---|---|---|---|
| CN | 107239740 A | | 10/2017 |
| CN | 108921029 A | | 11/2018 |
| CN | 108921030 A | | 11/2018 |
| CN | 109188388 A | | 1/2019 |
| CN | 110378204 A | | 10/2019 |
| CN | 111562569 A | | 8/2020 |
| CN | 111722199 A | | 9/2020 |
| CN | 112163450 A | | 1/2021 |
| CN | 112684428 A | * | 4/2021 |
| CN | 113033083 A | | 6/2021 |
| CN | 113534120 A | | 10/2021 |
| KR | 102060286 B1 | | 12/2019 |

OTHER PUBLICATIONS

Written Opinion in PCT/CN2022/105025 mailed on Oct. 14, 2022, 10 pages.
International Search Report in PCT/CN2022/105025 mailed on Oct. 14, 2022, 8 pages.
Cao, Zhihui et al., DNN Based Peak Sequence Classification CFAR Detection Algorithm for High-Resolution FMCW Radar, IEEE Transactions on Geoscience and Remote Sensing, 2022, 15 pages.
Liang, Cong et al., Target Recognition of Radar Amplitude Series Based on Depth Neural Network, Computer Knowledge and Technology, 2020, 3 pages.
Li, Qingzhong et al., Sea Surface Target Detection Algorithm for RD Images of HFSWR, Modern Radar, 42(8): 6-12 & 18, 2020.
Han, Shuai, Radar Clutter Recognition Based on Convolutional Neural Network Design and hardware implementation, Full-text Database of Excellent Master's Dissertations in China (Information Technology Series), 2019, 78 pages.
N.B. Gálvez, Efficient Non Homogeneous CFAR Processing, Latin American Applied Research, 41: 1-9, 2011.
Jabran Akhtar, Training of Neural Network Target Detectors Mentored by SO-CFAR, Eusipco, 1522-1526, 2020.

* cited by examiner

DEEP NEURAL NETWORK (DNN)-BASED MULTI-TARGET CONSTANT FALSE ALARM RATE (CFAR) DETECTION METHODS

CROSS REFERENCE TO RELATED APPLICATIONS

This application is a continuation-in-part of International Patent Application No. PCT/CN2022/105025, filed on Jul. 12, 2022, which claims priority to the Chinese Patent Application No. 202110793105.7, field on Jul. 14, 2021, the entire contents of each of which are incorporated herein by reference.

TECHNICAL FIELD

The present disclosure relates to the technical field of multi-target constant false alarm rate (hereinafter referred to as CFAR) detection of frequency modulated continuous wave (FMCW) radar, and in particular, to DNN-based multi-target CFAR detection methods.

BACKGROUND

Multi-target detection is very challenging, especially in scenes with densely distributed targets. In traditional CFAR detection methods, a detection threshold is determined based on a pre-estimated background level. However, interfering targets will inevitably lead to inaccurate background level estimation, resulting in poor detection performance.

Therefore, it is desirable to provide a DNN-based multi-target CFAR detection method to reduce the influence of the interfering targets and improve the detection performance.

SUMMARY

One or more embodiments of the present disclosure provide a DNN-based multi-target CFAR detection method. The method may be performed based on a processor, including: obtaining target values to be measured based on radar intermediate frequency (IF) signals to be detected, the target values to be measured including a measured frequency value and a measured intensity value of the radar IF signals to be detected; obtaining peak sequences based on the target values to be measured; generating a target detection result by processing the peak sequences based on a deep neural network (DNN) detector, the DNN detector being a machine learning model; generating approximated maximum likelihood estimation (AMLE) of a scale parameter based on an approximated maximum likelihood estimator; generating a false alarm adjustment threshold based on a preset false alarm rate and the AMLE; and generating a constant false alarm detection result by processing the target detection result based on the false alarm adjustment threshold.

One or more embodiments of the present disclosure provide a DNN-based multi-target CFAR detection system. The system may include: a detection device configured to obtain radar IF signals to be detected; and a processor configured to: obtain target values to be measured based on the radar IF signals to be detected, the target values to be measured including a measured frequency value and a measured intensity value of the radar IF signals to be detected; obtain peak sequences based on the target values to be measured; generate a target detection result by processing the peak sequences based on a DNN detector, the DNN detector being a machine learning model; generate AMLE of a scale parameter based on an approximated maximum likelihood estimator; generate a false alarm adjustment threshold based on a preset false alarm rate and the AMLE; and generate a constant false alarm detection result by processing the target detection result based on the false alarm adjustment threshold.

One or more embodiments of the present disclosure provide a DNN-based multi-target CFAR detection device. The device may include a processor configured to perform the DNN-based multi-target CFAR detection method.

One or more embodiments of the present disclosure provide a non-transitory computer-readable storage medium storing computer instructions. After reading the computer instructions in the storage medium, a computer may perform the DNN-based multi-target CFAR detection method.

BRIEF DESCRIPTION OF THE DRAWINGS

The present disclosure will be further illustrated by way of exemplary embodiments, which will be described in detail with the accompanying drawings. These embodiments are non-limiting. In these embodiments, the same number indicates the same structure, wherein.

DETAILED DESCRIPTION

Figure 1:
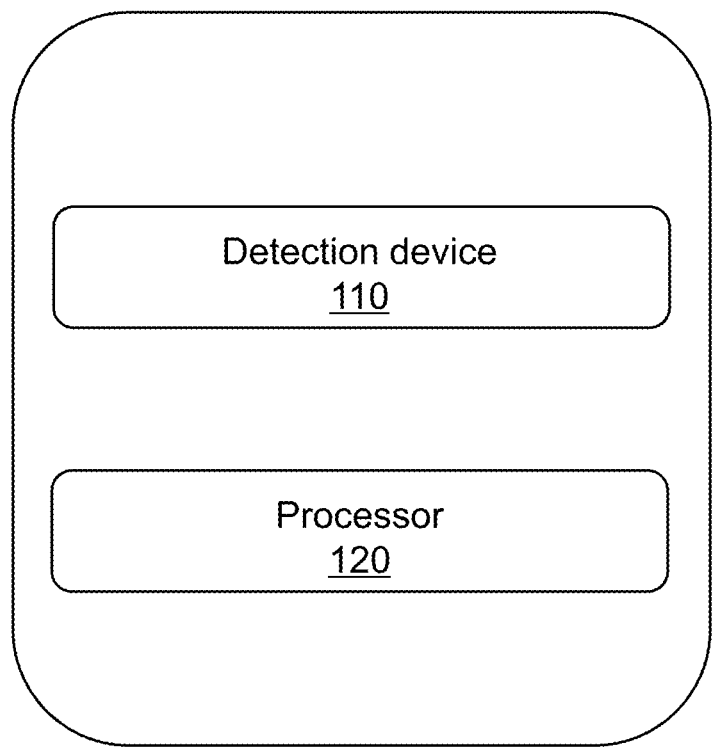
FIG. 1 is a schematic diagram illustrating a DNN-based multi-target CFAR detection system according to some embodiments of the present disclosure.

In order to more clearly illustrate the technical solutions of the embodiments of the present disclosure, the following briefly introduces the drawings that need to be used in the description of the embodiments. Apparently, the accompanying drawings in the following description are only some examples or embodiments of the present disclosure, and those skilled in the art can also apply the present disclosure to other similar scenarios according to the drawings without creative efforts. Unless obviously obtained from the context or the context illustrates otherwise, the same numeral in the drawings refers to the same structure or operation. As shown in the present disclosure and claims, unless the context clearly prompts the exception, "a", "one", and/or "the" is not specifically singular, and the plural may be included. It will be further understood that the terms "comprise," "comprises," and/or "comprising," "include," "includes," and/or "including," when used in the present disclosure, specify the presence of stated steps and elements, but do not preclude the presence or addition of one or more other steps and elements thereof.

FIG. 1 is a schematic diagram illustrating a DNN-based multi-target CFAR detection system according to some embodiments of the present disclosure. As shown in FIG. 1, a DNN-based multi-target CFAR detection system 100 may include a detection device 110 and a processor 120.

The detection device 110 may be configured to detect a target to be detected in a target place, and obtain radar IF signals to be detected reflected by the target to be detected. For example, the detection device may include a device capable of transmitting or receiving electromagnetic waves, such as a radar.

In some embodiments, the detection device 110 may be disposed in the target place. In some embodiments, the detection device 110 may transmit the electromagnetic waves to the target place, and receive radar IF signals to be detected reflected back by a plurality of targets (including the target to be detected and interfering targets) in the target place.

The target place refers to a place where multi-target detection is required. For example, the target place may include a park, a parking lot, or the like. In some embodiments, a plurality of targets to be detected may be included in the target place. The targets to be detected refer to targets to be detected in the target place. For example, when the target place is a parking lot, the targets to be detected may be vehicles in the parking lot.

In some embodiments, the targets to be detected may be dynamic targets, i.e., the targets to be detected may change with time. Merely by way of example, in some embodiments of the present disclosure, the DNN-based multi-target CFAR detection method may be described using the parking lot as the target place, and a plurality of vehicles parked in the parking lot as the targets to be detected.

Taking the target place as the parking lot as an example, the detection device 110 may transmit the electromagnetic waves to the parking lot, and receive the radar IF signals to be detected reflected back by the targets to be detected and the interfering targets; and the detection device 110 may transmit the obtained radar IF signals to be detected to the processor 120. The targets to be detected may be the vehicles parked in the parking lot, the interfering targets may include other devices in the parking lot, such as a tree, a building, etc., and the radar IF signals to be detected may include the radar IF signals reflected back by the targets to be detected and the interfering targets.

In some embodiments, the detection device 110 may also detect the plurality of targets to be detected in the target plate by transmitting the reflected radar IF signals to be detected to the processor 120 for analysis. For example, the detection device 110 may detect parked vehicles by transmitting the radar IF signals to be detected reflected back by the targets to be detected and the interfering targets in the parking lot to the processor 120 for analysis.

The processor 120 may be configured to process data and/or information obtained from other devices or system components. For example, the processor 120 may obtain target values to be measured based on the radar IF signals to be detected transmitted by the detection device 110. More descriptions regarding the target values to be measured may be found in operation 210.

In some embodiments, the processor 120 may include one or more processing engines (e.g., a single-chip processing engine or a multi-chip processing engine). Merely by way of example, the processor 120 may include a central processing unit (CPU), an application-specific integrated circuit (ASIC), or the like, or any combination thereof.

In some embodiments, the processor 120 may be set independently and connected with the detection device 110 through a network. The processor 120 may also be integrated into other devices/modules of the DNN-based multi-target CFAR detection system 100, such as the detection device 110, or the like.

In some embodiments, the processor 120 may also be configured to perform the DNN-based multi-target CFAR detection method, including: obtaining target values to be measured based on radar IF signals to be detected; obtaining peak sequences based on the target values to be measured; generating target detection results by processing the peak sequences based on a DNN detector, the DNN detector being a machine learning model; generating AMLE of a scale parameter based on an approximated maximum likelihood estimator; generating a false alarm adjustment threshold based on a preset false alarm rate and the AMLE; and generating a constant false alarm detection result by processing the target detection results based on the false alarm adjustment threshold. More descriptions regarding the relevant contents may be found in FIG. 2.

Continue to take the target place as the parking lot or a real road as an example; the processor 120 may obtain the target values to be measured (i.e., a measured frequency value and a measured intensity value of the radar IF signals to be detected) based on the radar IF signals to be detected (i.e., the radar IF signals reflected back by the targets to be detected and the interfering targets), and obtain a detection result of the vehicles based on the CFAR by performing a series of processing on the target values to be measured.

In some embodiments of the present disclosure, the descriptions in which the real road or the parking lot scene is used as the target place may only be examples. Expectably, those skilled in the art may apply the DNN-based multi-target CFAR detection system and method to other multi-target recognition scenes in other places, e.g., a park, a playground, a construction site, etc.

In some embodiments, the DNN-based multi-target CFAR detection system may further include other devices/equipment/modules not shown in the figure, e.g., a storage module for storing various data, information, and instructions; a network for realizing interconnection and communication between the detection device 110 and the processor 120; or camera equipment used to collect image information of the target place and other modules with functions of input, output, and display.

Figure 2:
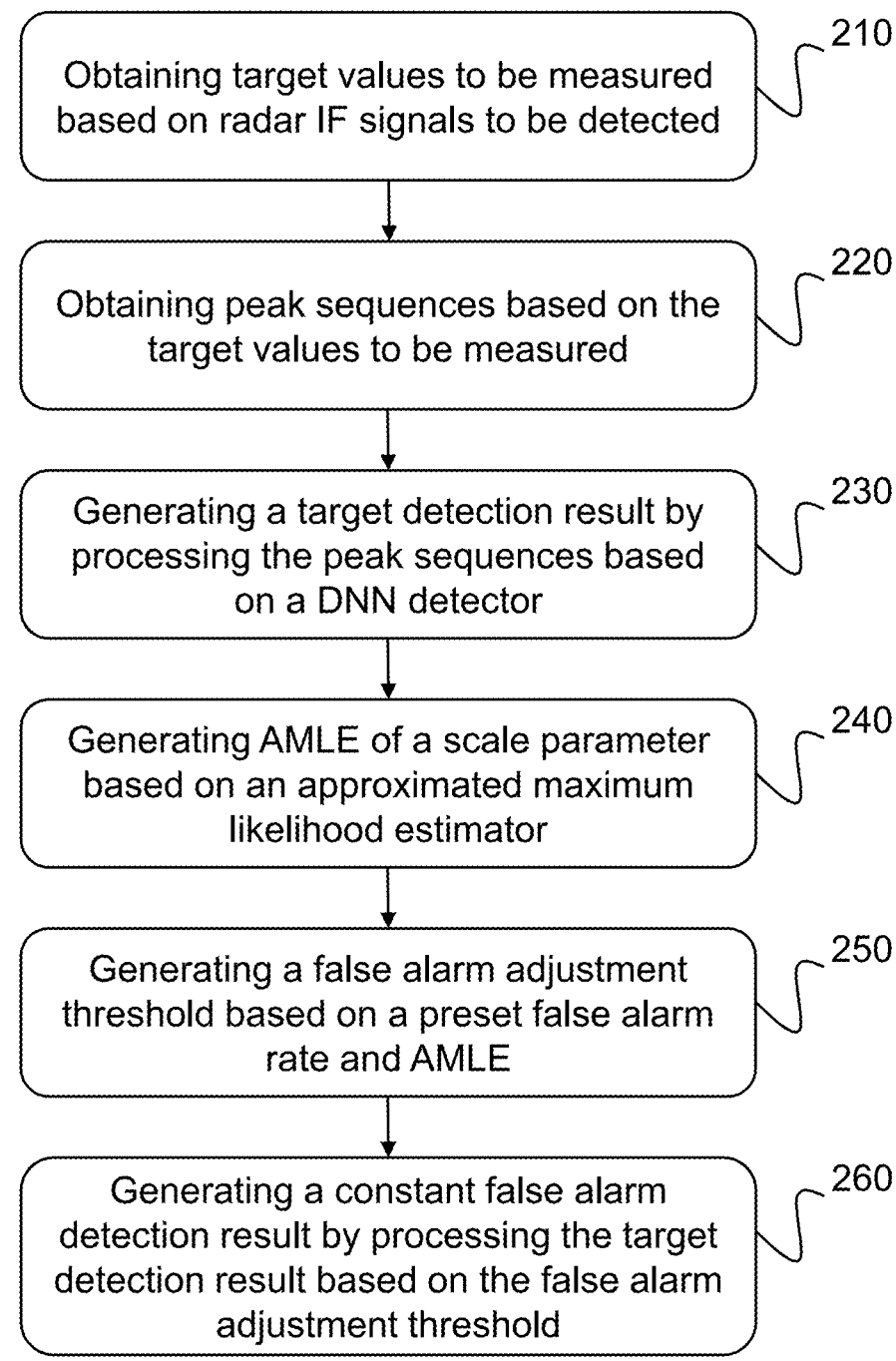
FIG. 2 is a schematic flowchart illustrating a DNN-based multi-target CFAR detection method according to some embodiments of the present disclosure.

FIG. 2 is a schematic flowchart illustrating a DNN-based multi-target CFAR detection method according to some embodiments of the present disclosure. In some embodiments, one or more operations of the process 200 in FIG. 2 may be implemented in the DNN-based multi-target CFAR detection system in FIG. 1. In some embodiments, the process 200 may be performed by a processor. In some embodiments, as shown in FIG. 2, the process 200 may include the following operations.

In 210, obtaining target values to be measured based on radar IF signals to be detected.

The radar IF signals to be detected refer to radar IF signals reflected back by targets (including targets to be detected and interfering targets) in a target place. In some embodiments, the radar IF signals to be detected may be obtained by the detection device 110 and transmitted to the processor 120.

Merely by way of taking the target place as a parking lot as an example, the targets may include a parked vehicle, a building, a tree, or the like. The parked vehicle may be the target to be detected, and other targets such as the building and the tree may be the interfering targets.

The target values to be measured may include a measured frequency value and a measured intensity value of the radar IF signals to be detected. In some embodiments, the target values to be measured may also be expressed as a measure of a radar frequency intensity to be detected.

In some embodiments, the target values to be measured may be obtained by performing Fourier transform on a large number (e.g., 800) of the radar IF signals to be detected by the processor in one execution.

In 220, obtaining peak sequences based on the target values to be measured.

The peak sequence refers to a sequence corresponding to a peak value of the measured frequency value and a peak value of a measured intensity value of a radar IF signal to be detected in the target values to be measured. In some embodiments, the processor 120 may obtain the peak sequences by taking the peak value of the measured frequency value and the measured intensity value of the radar IF signals to be detected in the target values to be measured.

In 230, generating a target detection result by processing the peak sequences based on a DNN detector.

The target detection result refers to a detection result corresponding to the targets to be detected. In some embodiments, the target detection result may include detection results corresponding to the targets to be detected and the interfering targets. Taking the target place as a parking lot as an example, the target detection result may include the parked vehicles and a plurality of interfering targets. For example, the target detection result may be a sequence composed of probabilities that the radar IF signals corresponding to the parked vehicles and the plurality of interfering targets are recognized as the targets to be detected.

In some embodiments, the processor may also generate a constant false alarm detection result by processing the target detection result based on a false alarm adjustment threshold. More descriptions regarding the relevant content may be found in relevant parts below (e.g., operation 260).

The DNN detector may be a model configured to obtain the target detection result by processing the peak sequences. In some embodiments, the DNN detector may be a machine learning model, such as a DNN, or the like.

In some embodiments, the DNN detector may adopt a full connect neural network (FCNN). For example, a neural network architecture of the DNN detector may be expressed as a parametric compound nonlinear function containing $\mathcal{W}$, e.g.:

$$Z_K = \mathcal{N}(P_K; \mathcal{W}) = n_L(\ldots n_2(n_1(P_K; w_1); w_2); \ldots w_L) \quad (1).$$

where $P_K$ is the peak sequence, $n_\ell(\cdot; w_\ell)$ represents each layer of the network, and $\mathcal{W}$ represents an internal parameter of the neural network architecture. This function maps input data $P_K$ to output $Z_K$. A hidden layer and an output layer may adopt a full connect layer, e.g.:

$$Z_{K,\ell} = n_\ell(P_{K,\ell}; w_\ell), w_\ell = [\Phi_\ell, b_\ell] = h(\Phi_\ell^T P_{K,\ell} + b_\ell). \quad (2)$$

where a weight coefficient $\Phi_\ell$ is a matrix of a dimension (M,N), M and N are custom values, a bias coefficient $b_\ell$ is a vector with a length of M, $h(\cdot)$ is an activation function, and $Z_{K,\ell}$ represents an output of each layer.

In some embodiments, the DNN detector may be deployed for the detection of the target detection result, and its output $Z_K$ may be expressed as a probability mass function, e.g.:

$$Z_K = \begin{bmatrix} P(p_1 \in T|\mathcal{W}), P(p_1 \notin T|\mathcal{W}) \\ P(p_2 \in T|\mathcal{W}), P(p_2 \notin T|\mathcal{W}) \\ \vdots \\ P(p_K \in T|\mathcal{W}), P(p_K \notin T|\mathcal{W}) \end{bmatrix}. \quad (3)$$

where P denotes a target probability estimated by the DNN, e.g., $P(p_1 \in T|\mathcal{W})$ represents a probability that the neural network recognizes that the peak value $p_1$ of the radar IF signals to be detected belong to the targets to be detected when a parameter of the neural network architecture is $\mathcal{W}$; and $P(p_1 \notin T|\mathcal{W})$ represents a probability that the neural network recognizes that p1 does not belong to the targets to be detected when the parameter of the neural network architecture is $\mathcal{W}$. The target detection result may be expressed as $Y = \{y_1, y_2, \ldots, y_M\}$, where $y_1, y_2, \ldots, y_M$ respectively represent probabilities that the peak sequences $p_1, p_2, \ldots, p_m$ of the input radar IF signals to be detected belong to the targets to be detected.

In some embodiments, the processor may further determine whether the peak sequences of the radar IF signals to be detected belong to the targets to be detected. For example, the processor may determine the peak sequences of the radar IF signals corresponding to the targets of which the probabilities are greater than a preset threshold as the targets to be detected and mark the targets to be detected as 1, and determine other targets are clutter and mark the clutter as 0. In some embodiments, the target detection results may also be expressed as sequences composed of 1 and 0, where 1 denotes the targets to be detected, and 0 denotes the clutter.

In some embodiments, the DNN detector may be obtained based on training of an initial DNN detector based on a simulation data set satisfying a first preset condition. The details of the relevant descriptions may be found in FIG. 5.

In one or more embodiments of the present disclosure, processing the target values to be detected based on the machine learning model may achieve higher processing efficiency and improve the recognition accuracy of the targets to be detected in comparison with traditional processing methods.

In 240, generating AMLE of a scale parameter based on an approximated maximum likelihood estimator.

In some embodiments, the approximated maximum likelihood estimator may be determined based on curtailing samples. In some embodiments, the curtailing samples may be obtained by: in response to the target values to be measured satisfying a second preset condition, obtaining the curtailing samples based on the target values to be measured and the target detection result.

The curtailing samples refer to samples $\tilde{x}$ after removing the target detection result Y from the target values to be measured X. Taking the target place as a parking lot as an example, the curtailing samples may be samples composed of radar IF signals corresponding to remaining targets (e.g., a building, a tree, and other interfering targets) after removing the radar IF signals corresponding to the parked vehicles. In some embodiments, the processor 120 may model clutter (i.e., electromagnetic waves corresponding to the interfering targets) in the curtailing samples using a truncated Rayleigh distribution. The truncated Rayleigh distribution refers to a Rayleigh distribution after truncation of data obeying the Rayleigh distribution with a certain truncation depth (e.g., $\alpha$). For example, a truncation operation may include deleting data greater than $\alpha$ from original sample data.

The second preset condition refers that the clutter in the target values to be measured X obeys the Rayleigh distribution.

For example, the processor may obtain the curtailing samples by removing the target detection results from the target values to be measured, and model the clutter in the curtailing samples using the Rayleigh distribution. Removing the target detection results refers to removing the peak sequences of the radar IF signals corresponding to the targets marked as 1 of the target detection result Y from the target values to be measured.

The approximated maximum likelihood estimator may be configured to determine approximated maximum estimation of a scale parameter. In some embodiments, the approximated maximum likelihood estimator may be constructed by the processor 120. In some embodiments, the curtailing samples may include a large amount of data such as radar IF signals corresponding to the clutter. For example, the approximated maximum likelihood estimator may be determined by the processor based on the following method:

(1) taking a log-likelihood function of the curtailing samples $\tilde{x}$:

$$\log \mathcal{L}(\sigma|\tilde{x}) = -N\log\sigma^2 - \frac{1}{2\sigma^2}\sum_{i=1}^{N}\tilde{x}_i^2 \\ -N\log\left(1-e^{-\alpha^2/2\sigma^2}\right)+\sum_{i=1}^{N}\log\tilde{x}_i, \quad (4)$$

where $\log \mathcal{L}(\sigma|\tilde{x})$ is the log-likelihood function of the curtailing samples, $\alpha$ is the truncation depth, $\sigma$ is the scale parameter to be estimated, i is an index of the curtailing samples, e is a natural constant, and N represents a length of the curtailing samples.

(2) taking a derivative of the log-likelihood function of the curtailing samples $\tilde{x}$ with respect to $\sigma$, and setting the derivative equal to 0:

$$\frac{\partial \log L(\sigma|\tilde{x})}{\partial \sigma} = -\frac{2N}{\sigma} + \frac{1}{\sigma^3}\sum_{i=1}^{N}\tilde{x}_i^2 + \frac{N\alpha^2 e^{-\alpha^2/2\sigma^2}}{\sigma^3\left(1-e^{-\alpha^2/2\sigma^2}\right)} \\ = 0 \quad (5)$$

Setting $\xi=\alpha/\sigma$, and setting a function $g(x)=x \exp(-x^2/2)/[1-\exp(-x^2/2)]$, where x represents an independent variable of the function.

Rewriting the above formula (5) as:

$$\frac{\partial \log L(\sigma|\tilde{x})}{\partial \sigma} = -\frac{2N}{\sigma} + \frac{1}{\sigma^3}\sum_{i=1}^{N}\tilde{x}_i^2 + \frac{N\alpha}{\sigma^2}g(\xi) \\ = 0 \quad (6)$$

where an approximate result of $g(\xi)$ may be obtained by Taylor expansion at the point and discarding high-order terms:

$$g(\xi) \approx g(a)+g'(a)(\xi-a) \quad (7).$$

where $g'(a)$ is the first derivative of the function $g(a)$, and a is a variable of the function.

With the equation of $g(\xi)$, the derivative equation of the log-likelihood function may be further rewritten as:

$$\frac{\partial \log L(\sigma|\tilde{x})}{\partial \sigma} \approx -\frac{1}{\sigma^3}\left\{2N\sigma^2 + N\alpha[g'(a)a-g(a)]\sigma\right\} \\ -\frac{1}{\sigma^3}\left[-N\alpha^2 g'(a) - \sum_{i=1}^{N}\tilde{x}_i^2\right] \\ = 0 \quad (8)$$

The solution to the above equation is equivalent to:

$$2N\sigma^2 + b^*\sigma + c^* = 0 \quad (9)$$

-continued subject to $\sigma \to \sqrt{\frac{1}{2N}\sum_{i=1}^{N}x_i^2}$, as $\alpha \to \infty$ where $b^* = N\alpha[g'(a)a - g(a)]$, $c^* = -N\alpha^2 g'(a) - \sum_{i=1}^{N}\tilde{x}_i^2$.

$\sqrt{\frac{1}{2N}\sum_{i=1}^{N}x_i^2}$ is the maximum likelihood estimation for the scale parameter $\sigma$ of an untruncated Rayleigh distribution.

Solving equation (9), the approximated maximum likelihood estimator $\hat{\sigma}_{AMLE}$ corresponding to the scale parameter $\sigma$ is:

$$\hat{\sigma}_{AMLE} = \frac{-b^* + \sqrt{b^{*2} - 8Nc^*}}{4N}. \quad (10)$$

In some embodiments, the processor may determine the AMLE of the scale parameter $\sigma$ based on the approximated maximum likelihood estimator $\hat{\sigma}_{AMLE}$. For example, the processor may calculate the AMLE of the scale parameter based on the approximated maximum likelihood estimator.

In 250, generating a false alarm adjustment threshold based on a preset false alarm rate and the AMLE.

The false alarm rate refers to a probability of determining the clutter or other interfering noise as the targets to be detected. For example, the false alarm rate may be preset by the processor through formula (11):

$$P_{FA}=P(X_c \geq T_{fa})=\int_{T_{fa}}^{\infty} f_{X_c}(x;\sigma)dx \quad (11),$$

where $$f_{X_c}(x;\sigma) = \frac{x}{\sigma^2}e^{-\frac{x^2}{2\sigma^2}}$$

is a probability density function of the clutter, $P(X_c \geq T_{fa})$ represents a probability that $X_c$ is greater than the false alarm adjustment threshold, and $X_c$ represents samples composed of the clutter.

The false alarm adjustment threshold refers to a threshold for adjusting the false alarm rate. In some embodiments, the false alarm adjustment threshold $T_{fa}$ may be determined based on the false alarm rate and the AMLE of the scale parameter. For example, the processor may determine the false alarm adjustment threshold by formula (12):

$$T_{fa} = \sqrt{-2\hat{\sigma}_{AMLE}^2 \log P_{FA}}. \quad (12)$$

In 260, generating a constant false alarm detection result by processing the target detection result based on the false alarm adjustment threshold.

The constant false alarm detection result refers to a detection result that when the clutter changes, the detection device adjusts its sensitivity accordingly so that the false alarm rate remains constant. Taking the target place as a parking lot as an example, the constant false alarm detection result may be a detection result that the false alarm rate of the parked vehicles remains constant.

In some embodiments, the processor may generate the constant false alarm detection result by processing the target detection result based on the false alarm adjustment threshold. For example, the processor may obtain the constant false alarm detection result by removing targets below the false alarm adjustment threshold from the detection result. In some embodiments, as shown in FIG. 4(i), the processor may display the constant false alarm detection result to a user through a display device.

The DNN-based multi-target CFAR detection method in one or more embodiments of the present disclosure can focus on the FMCW radar multi-target detection method and achieve target detection by using a new detection algorithm without relying on pre-estimated environmental background level, thereby comprehensively and effectively overcoming the multi-target shadowing effect.

Figure 3:
FIG. 3 is a schematic diagram illustrating a multi-target scene according to some preferred embodiments of the present disclosure.

FIG. 3 is a schematic diagram illustrating a multi-target scene according to some preferred embodiments of the present disclosure. As shown in FIG. 3, some preferred embodiments of the present disclosure select a real road scene as a target place, and vehicles parked therein as targets to be detected. In a real road scene, the vehicles are densely distributed and located between open roads and dense trees, representing that target detection for the scene may be done in a multi-target environment as well as in a clutter edge environment. A high-resolution millimeter wave radar with a working frequency band of 76-81 GHz may be used as a detection device. A radar system may apply the DNN-based multi-target CFAR detection method described in some embodiments of the present disclosure.

In this embodiment, a data-augmented simulation data set containing a total of 50,000 frames of data may be established and evenly divided into 10 sets, of which 8 sets may be used as training sets and 2 sets may be used as verification sets. Then an FCNN may be as a DNN detector, and the detector may be trained using the simulation data set. Backpropagation may be completed using an Adam optimizer, a learning rate may be set to 0.01, and a batch size may be set to 150. The trained detector may be deployed to detect and output a detection result Y. Finally, curtailing samples $\tilde{x}$ may be obtained by removing the detection result Y from original samples, and a scale parameter σ may be estimated by the approximated maximum likelihood estimator. Then a false alarm adjustment threshold $T_{fa}$ may be determined, targets of which the false alarm rates are lower than the false alarm adjustment threshold $T_{fa}$ may be removed, and finally a constant false alarm detection result may be output.

Figure 4:
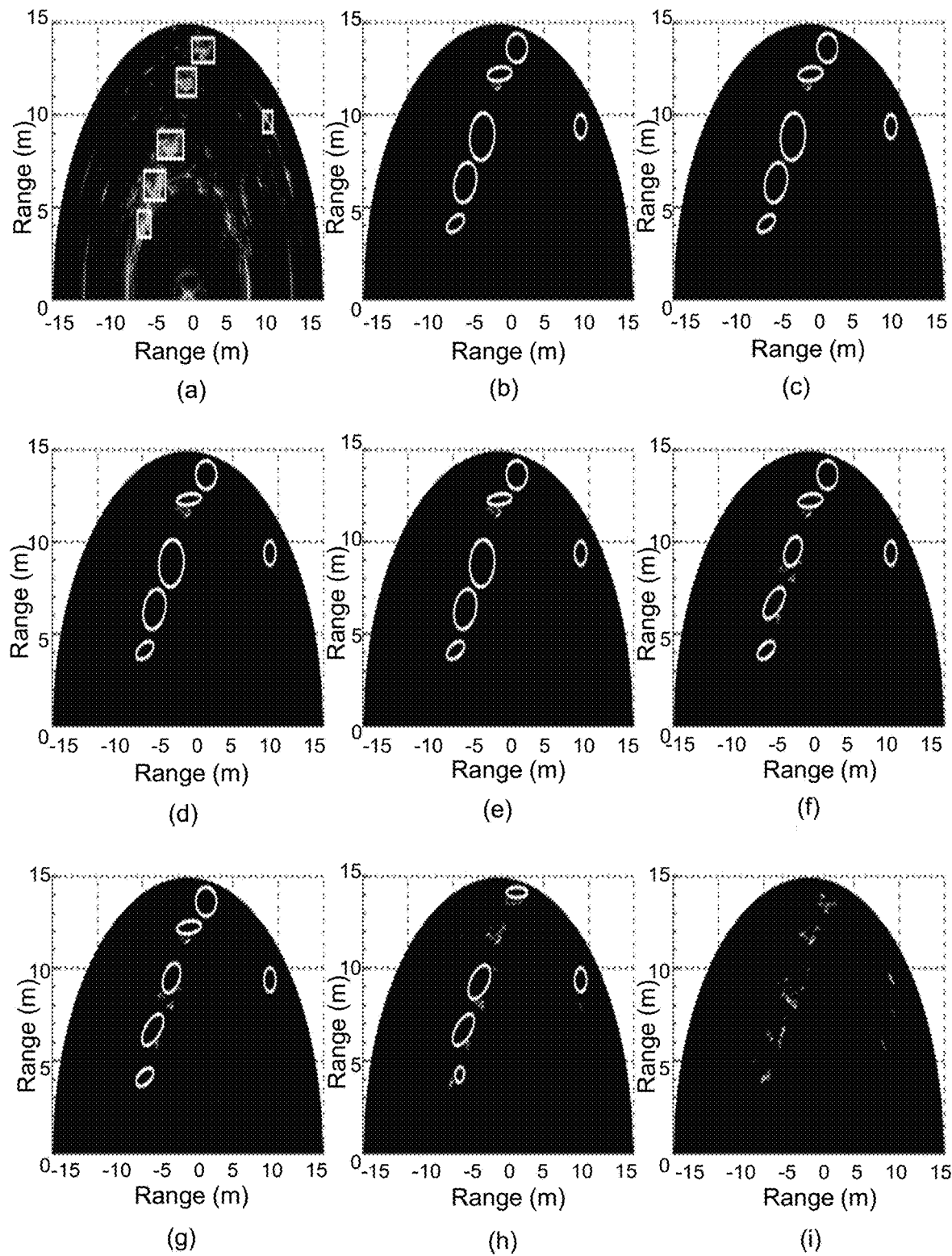
FIG. 4 is a performance comparison diagram illustrating the DNN-based multi-target CFAR detection method according to some embodiments of the present disclosure and existing CFAR detection methods.

FIG. 4 is a performance comparison diagram illustrating a DNN-based multi-target CFAR detection method according to some embodiments of the present disclosure and existing CFAR detection methods. As shown in FIG. 4, FIG. 4(a) illustrates an original radar image, and rectangular boxes represent targets to be detected in a scene within a radar detection range; FIG. 4(b) illustrates an imaging result of a VI-CFAR algorithm; FIG. 4(c) illustrates an imaging result of an ICVI-CFAR algorithm; FIG. 4(d) illustrates an imaging result of an OS-CFAR algorithm; FIG. 4(e) illustrates an imaging result of an ICOS-CFAR algorithm; FIG. 4(f) illustrates an imaging result of an OR-CFAR algorithm; FIG. 4(g) illustrates an imaging result of an ICOR-CFAR algorithm; FIG. 4(h) illustrates an imaging result of a SACM-CFAR algorithm; and FIG. 4(i) illustrates an imaging result of the DNN-based multi-target CFAR detection method according to some embodiments of the present disclosure. Missed parts in FIG. 4(b)-(i) are marked with circles.

The results show that the DNN-based multi-target CFAR detection method described in some embodiments of the present disclosure is superior to the existing CFAR detection methods, and completely detects all the targets. The results show that the DNN-based multi-target CFAR detection method described in some embodiments of the present disclosure effectively overcomes the multi-target shadowing effect, and has better performance in dense target scenes.

Figure 5:
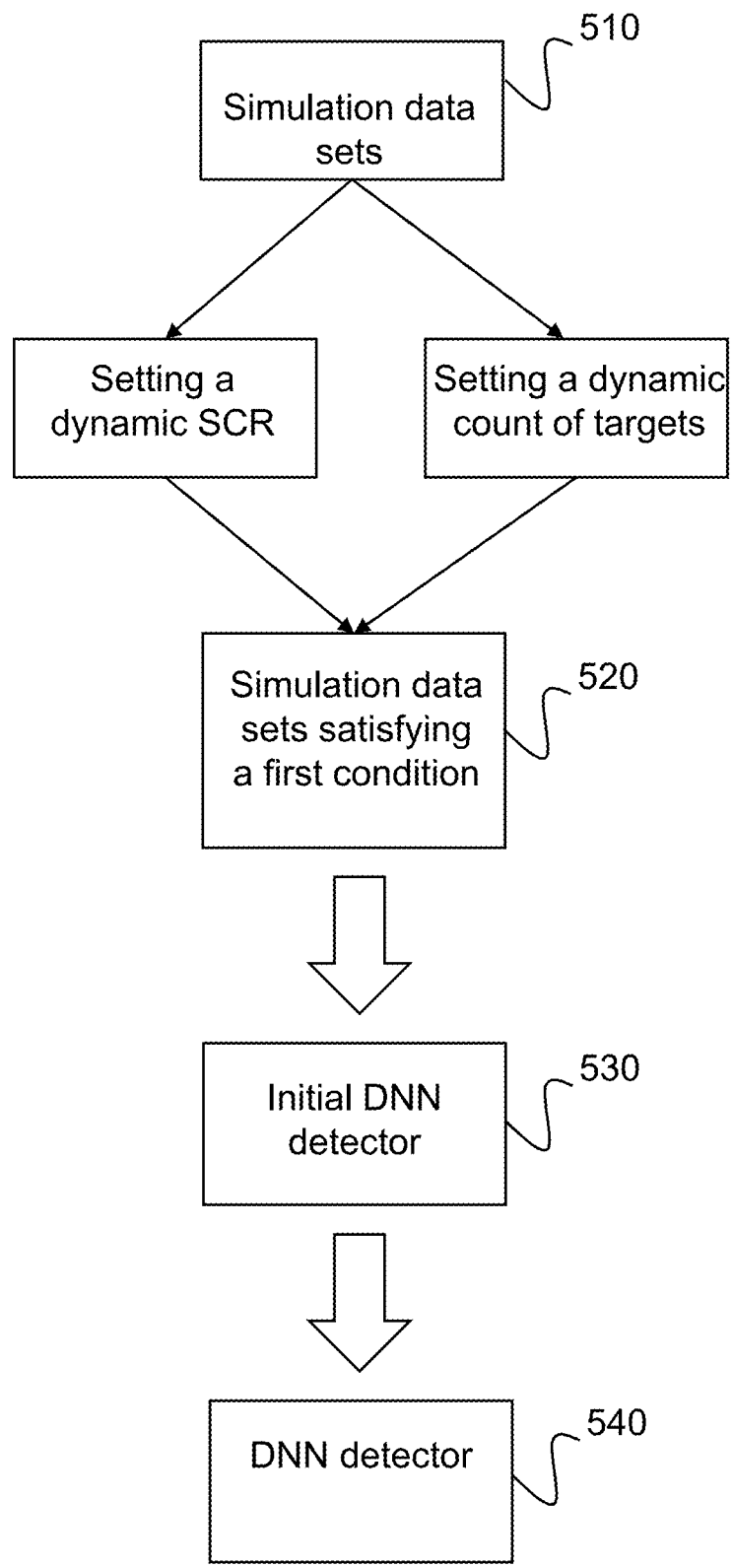
FIG. 5 is a schematic diagram illustrating an exemplary process for obtaining a DNN detector according to some embodiments of the present disclosure.

FIG. 5 is a schematic diagram illustrating an exemplary process for obtaining a DNN detector according to some embodiments of the present disclosure. As shown in FIG. 5, obtaining the DNN detector may include: obtaining simulation data sets 520 satisfying a first condition by setting dynamic signal-to-clutter ratios (SCR) and a dynamic count of targets for simulation data sets 510; and obtaining a trained DNN detector 540 by training an initial DNN detector 530 using the simulation data sets 520 satisfying the first condition as training samples and target detection results corresponding to the simulation data sets 520 as labels. The initial DNN detector 530 refers to a DNN detector with no parameter set.

In some embodiments, the DNN detector may be obtained based on the training of the initial DNN detector based on the simulation data sets satisfying the first preset condition. For example, the processor may obtain the trained DNN detector by constructing the initial DNN detector and training the initial DNN detector using the simulation data sets satisfying the first preset condition.

The simulation data sets 510 refer to data sets configured to train the initial DNN detector. In some embodiments, the simulation data sets may be obtained based on simulation software. For example, the simulation data sets may be expressed as:

$$\{(L_{K_1}^{(1)}, R_{K_1}^{(1)}, I_{K_1}^{(1)}), (L_{K_2}^{(2)}, R_{K_2}^{(2)}, I_{K_2}^{(2)}), \ldots, (L_{K_n}^{(n)}, R_{K_n}^{(n)}, I_{K_n}^{(n)})\}.$$

where n is a count of training samples, and n is a length of a peak sequence of a nth training sample; $L_K$ is a real label, if the signal is an electromagnetic wave signal reflected by a target to be detected, the real label is marked as 1, and if the signal is an electromagnetic wave (i.e., clutter) signal reflected by an interfering target, then the real label is marked as 0; $R_K$ is a peak distance sequence and is expressed as $[r_1, r_2, \ldots, r_K]$, which may be understood as a sequence formed by signal frequencies of radar IF signal samples, and $I_K$ is a peak intensity sequence corresponding to $R_K$ and is expressed as $[i_1, i_2, \ldots, i_K]$, which may be understood as a sequence formed by signal intensities of the radar IF signal samples; the peak sequence $P_K$ which is expressed as $(R_K, I_K)$ may be obtained by performing Fourier transform on the radar IF signal samples first, then obtaining the target values to be measured by modeling, and then taking the peak values of the target values to be measured.

In some embodiments, the simulation data sets may include a plurality of radar IF signal samples for training the initial DNN detector.

The simulation data sets 520 satisfying the first condition refer to simulation data sets with the dynamic SCRs and the dynamic count of targets.

The first preset condition may include that the radar IF signal samples in the simulation data sets have the dynamic SCRs and the dynamic count of targets. The dynamic SCRs and the dynamic count of targets refer to that the SCRs and the count of targets corresponding to the radar IF signal samples are changing dynamically. Taking the target place as a parking lot as an example, the targets to be detected may be parked vehicles, the vehicles may drive in and out, and thus the targets to be detected in the target place may change dynamically. Correspondingly, the dynamic SCRs and the dynamic count of targets may be set for the radar IF signals (i.e., the radar IF signal samples) in the simulation data sets.

In some embodiments, the first preset condition may be realized based on data augmentation. A data augmentation manner may include: augmenting the simulation data sets based on the dynamic SCRs by setting the dynamic SCRs corresponding to the radar IF signal samples; and augmenting the simulation data sets by setting the dynamic count of targets for the radar IF signal samples and generating a distance sequence based on an additive random sampling manner.

For example, the processor may augment the simulation data sets by setting the dynamic SCRs for the radar IF signal samples, including:

(1) Setting the dynamic SCRs corresponding to the radar IF signal samples. For example, the dynamic SCRs may be set based on formula (13):

$$SCR_k = \overline{SCR} + u \quad (13).$$

where $\overline{SCR}$ is a specified average SCR, u is an SCR variation factor and obeys a first Gaussian distribution $N(0, u^2)$, and k is a target sequence count.

(2) Augmenting the simulation data sets based on $SCR_k$. For example, an echo signal of the kth target of the radar IF signal samples is multiplied by its echo power, as shown in formula (14):

$$P_{r,k} = P_c \cdot 10^{SCR_k/10} \quad (14),$$

where $P_c$ is a clutter power, $\overline{SCR}$ is set as a random count, so that each radar IF signal sample may have a dynamic SCR, and $P_{r,k}$ represents the echo power corresponding to a kth target.

In some embodiments, the processor may also augment the simulation data set by setting the dynamic count of targets for the radar IF signal samples and generating the distance sequence based on the additive random sampling manner.

For example, the additive random sampling manner may be determined based on formula (15):

$$r_k = \begin{cases} r_{k-1} + \tau_k, & k \geq 1 \\ 0, & k = 0 \end{cases} \quad (15)$$

where $r_k$ is a distance of the kth target (e.g., a distance between the target and a detection device), and $\tau_k$ is a sampling distance interval. For example, the sampling distance interval may be expressed as:

$$\tau_k = N\left(\frac{D_W}{m}, \mu^2 \frac{D_W^2}{m^2}\right) + s. \quad (16)$$

where $D_W$ is a sampling distance window, which is consistent with a ranging range of the detection device (e.g., a radar); μ is a scaling factor; and s is a distance variation factor, and obeys a second Gaussian distribution $N(0, s^2)$.

In one or more embodiments of the present disclosure, a situation that a distance between adjacent sampling points is smaller than a distance resolution of the detection device may be avoided by properly selecting the additive random sampling manner. The distance resolution refers to a minimum distance that the detection device may distinguish between two targets located at a same azimuth but at different distances from the detection device. is the count of targets, which is set as a random count to make each sample have a dynamic count of targets.

In some embodiments, the dynamic SCR and the dynamic count of targets may also be determined based on an estimated scene feature distribution of a target place. More descriptions regarding the target place may be found in FIG. 1.

In some embodiments, the target place may include the estimated scene feature distribution. The estimated scene feature distribution refers to an estimated scene feature distribution of the target place in a future time period. The future time period may be preset based on detection requirements.

In some embodiments, the estimated scene feature distribution may include an estimated target distribution and an estimated environmental distribution.

The estimated target distribution refers to a distribution of the targets to be detected in the target place in the future time period. Taking the target place as a parking lot as an example, the estimated target distribution may be a distribution of vehicles in the parking lot in the future time period. In some embodiments, the estimated target distribution may include a target count distribution and a target density distribution. For example, a count distribution and a density distribution of vehicle s parked in the parking lot.

The target count distribution refers to an estimated count distribution interval of the targets to be detected in the target place. Taking the target place as the parking lot as an example, the target count distribution may be an estimated possible vehicle count distribution interval in the parking lot.

For example, the target count distribution may be represented by an interval [a, b]; where a represents a minimum count of targets to be detected in the target place, and b represents a maximum count of targets to be detected in the target place.

In some embodiments, the minimum count a and the maximum count b of the targets to be detected may be obtained by the processor 120 based on historical data. For example, the minimum count and the maximum count of the vehicles to be detected in the parking lot may be determined by the processor 120 based on the data of historical parked vehicles in the parking lot.

The target density distribution refers to an estimated density distribution interval of the targets to be detected in the target place. Taking the target place as the parking lot as an example, the target density distribution may be a density distribution interval of the vehicles to be detected in the parking lot. A density refers to a density of targets in the target place. Merely taking the target place as the parking lot as an example, the density may be a count of vehicles parked per unit area in the parking lot.

For example, the target density distribution may be represented by an interval [c, d]; where c represents a minimum value of the target density in the target place, and d represents a maximum value of the target density in the target place.

In some embodiments, the minimum value and the maximum value of the density in the target place may be determined by the processor 120 through obtaining user input. For example, the user may input a parking space interval, an average parking amount, etc., of the parking lot through an input module, and the processor 120 may obtain the data input by the user, and estimate the minimum value and the maximum value of the density of the parked vehicles in the parking lot through a preset manner (e.g., a machine learning model, etc.).

The estimated environmental distribution refers to an environmental condition corresponding to the target place in the future time period. In some embodiments, the estimated environmental distribution may include an environmental complexity. The environmental complexity refers to a complexity of an environment and a climate of the target place. Taking the target place as the parking lot as an example, the estimated environmental distribution may include the complexity of the environment in the parking lot.

In some embodiments, the environmental complexity may be determined based on constituent elements and the climate of the target place. Taking the target place as the parking lot as an example, the constituent elements of the target place may include buildings, ground, street lamps, vegetation, or the like. In some embodiments, the constituent elements of the target place may be recognized and obtained by the processor 120 based on image data. The image data may be obtained by an imaging device installed at the target place. The climate refers to information corresponding to the climate (e.g., wind, rain, etc.) of the target place. The climate may be obtained by the processor 120 based on a third-party platform (e.g., a weather forecast platform, etc.). In some embodiments, the more constituent elements of the target place and/or the greater the degree of climate change, the greater the corresponding environmental complexity. Taking the target place as the parking lot as an example, the more buildings, street lamps, and vegetation in the parking lot and/or the greater the degree of climate change corresponding to the parking lot, the greater the environmental complexity of the parking lot.

In some embodiments, the environmental complexity of the target place may also be determined based on a variation of waveform features of the clutter at different times. Taking the target place as the parking lot as an example, the greater the variation of the waveform features of the clutter corresponding to the parking lot at different times, the greater the environmental complexity corresponding to the parking lot. In some embodiments, the environmental complexity of the target place may be determined based on the waveform features of the clutter through a first preset comparison table. The first preset comparison table may store the environmental complexity of the target place and the variation of the waveform features of the clutter at different times in the historical data. For example, a first preset comparison table that stores a relationship between the variation of the waveform features of the clutter of various types of parking lots at different times and the environmental complexity may be preset.

Taking the target place as the parking lot as an example, the processor 120 may determine the waveform features of the clutter corresponding to the parking lot; and determine the environmental complexity of the parking lot through the first preset comparison table based on the waveform features.

In some embodiments, the waveform variation features of the clutter corresponding to the target place may be determined by simulation. Taking the target place as the parking lot as an example, the processor 120 may simulate the parking lot and the detection device through simulation software, and determine the waveform variation features of the clutter corresponding to the parking lot by evaluating electromagnetic waves transmitted and returned by the simulated detection device.

In some embodiments, the estimated scene feature distribution may be preset by the processor in advance based on multi-target detection requirements. Taking the detection of a plurality of vehicles parked in the parking lot as an example, the processor may preset the estimated scene feature distribution corresponding to the parking lot based on information (e.g., a parking space spacing, an average parking amount, constituent elements of the parking lot, etc.) related to the parking lot input by the user.

In some embodiments, a variation factor of the dynamic SCR obeys the first Gaussian distribution, and a value of a standard deviation (also referred to as a first standard deviation) corresponding to the first Gaussian distribution may be determined based on the estimated environmental distribution of the target place. For example, the greater the environmental complexity corresponding to the estimated environmental distribution, the greater the value of the first standard deviation. Taking the target place as the parking lot as an example, the greater the environmental complexity of the parking lot, the greater the value of the first standard deviation.

In some embodiments, the first standard deviation may be determined through a second preset comparison table based on the environmental complexity corresponding to the estimated environmental distribution of the target place. The second preset comparison table may store the environmental complexity and the first standard deviation corresponding to the environmental complexity in the historical data. For example, the second preset comparison table storing a relationship between the environmental complexity of various parking lots and the first standard deviation may be preset.

In some embodiments, the value of the first standard deviation may also be related to the target density distribution of the target place.

For example, a correlation between the value of the first standard deviation and the target density distribution may include: in the interval [c, d] corresponding to the target density distribution, the closer the minimum value c of the target density to the maximum value d of the target density, the greater the first standard deviation.

In some embodiments, the environmental complexity, the target density distribution, and the first standard deviation in the historical data may also be stored in the second preset comparison table. Taking the target place as the parking lot as an example, the first standard deviation corresponding to the environmental complexity and the target density distribution of the parking lot in the historical data may be stored in the second preset comparison table, and the processor may determine the first standard deviation based on the environmental complexity and target density of the parking lot (i.e., the parking lot requiring target detection).

In one or more embodiments of the present disclosure, when determining the first standard deviation, the environmental complexity and the target density distribution of the target place may be considered simultaneously, so that the training samples may have a higher SCR, and the trained DNN detector may be more suitable for complex target places and denser targets to be detected, thereby improving the recognition effect of the targets to be detected.

In some embodiments, a value of the count m of targets in the simulation data set may be randomly generated based on a first preset distribution. Taking the target place as the parking lot as an example, the count of vehicles parked in the parking lot may be randomly generated based on the first preset distribution.

The first preset distribution may be a Gaussian distribution with a mean value of μ1 and a standard deviation of σ1. Where the mean value μ1 and standard deviation σ1 of the first preset distribution may be determined based on the estimated target distribution. For example, the value of μ1 and the value of ρ1 may be determined by the processor based on the following process: the value of μ1 may be a midpoint value of the target count distribution interval in the estimated target distribution; and the value of ρ1 may be determined based on the target count distribution interval (e.g., the wider the target count distribution interval, the greater the value of σ1, etc.) in the estimated target distribution. For example, σ1 and the target count distribution interval [a, b] may have a first correspondence σ1, which is expressed as $(b-a)^2/12$.

Taking the target place as the parking lot as an example, the value of μl may be the midpoint value of the count distribution interval of the parked vehicles in the parking lot; and the value of σ1 may be determined based on the count distribution interval of the parked vehicles in the parking lot. For example, the processor may determine the value of σ1 based on the first correspondence through a maximum value and a minimum value of the parked vehicles.

In one or more embodiments of the present disclosure, the count of targets in different samples may be generated based on the first random distribution, so that the proportions of samples with different counts of targets in the simulation data set may be different, the DNN detector obtained by training based on the simulation data set may better adapt to specific scene (e.g., scenes with a large variation in the count of targets to be detected), and the better prediction results may be obtained.

In some embodiments, the mean value of the first preset distribution may also be related to an upper limit of the target count distribution. For example, the mean value μ1 of the first preset distribution may also be a value of which a distance from the upper limit of the interval [a, b] corresponding to the target count distribution is smaller than a first threshold. The first threshold may be preset. The upper limit of the interval [a, b] corresponding to the target count distribution refers to a maximum value b of the interval. Taking the target place as the parking lot as an example, when the count of parked vehicles is in the interval [a, b] and the first threshold is 3, the value of μ1 may be a random value in the interval [b−3, b].

In one or more embodiments of the present disclosure, the first preset distribution may be related to the upper limit of the target count distribution, which may increase the proportion of randomly generated training samples with more targets to be detected, so that the DNN detector obtained through training may better adapt to target places with more targets to be detected.

In some embodiments, different scaling factors p and distance variation factors s may have different effects on the training of the DNN detector. For example, too small scaling factor μ and distance variation factor s may cause a distance between adjacent samples to be smaller than the distance resolution of the detection device (e.g., radar), resulting in an inability to recognize; and excessive scaling factor p and distance variation factor s may lead to inaccurate recognition results of the trained DNN detector in scenes where the targets to be detected are relatively dense.

In some embodiments, the scaling factor p and the distance variation factors may be determined based on the estimated target distribution (e.g., the target density distribution). Taking the target place as the parking lot as an example, in the interval [c, d] corresponding to the density distribution of the parked vehicles in the parking lot, the larger c and d, the denser the vehicles to be detected, and the smaller the corresponding scaling factor μ and the distance variation factor s, but the calculated sampling distance interval may not be less than the distance resolution of the radar.

In one or more embodiments of the present disclosure, by determining the scaling factor μ and the distance variation factor s based on the estimated target distribution and further obtaining the simulation data set, the proportions of samples with different target densities may be different, the DNN detector obtained from the training of the simulation data set may better adapt to the target places under different distribution conditions (e.g., the targets to be detected are relatively dense) of the targets to be detected.

In some embodiments, the scaling factor μ and the distance variation factors may also be randomly generated based on a second preset distribution.

The second preset distribution may be a Gaussian distribution with a mean value of $\mu_2$ and a standard deviation of $\sigma_2$. The mean value $\mu_2$ and the standard deviation $\sigma_2$ of the second preset distribution may be determined based on the estimated target distribution. For example, the value of $\mu_2$ may be a midpoint value of the target density distribution interval in the estimated target distribution; and the value of $\sigma_2$ may be determined based on the target density distribution interval (e.g., the wider the target density distribution interval, the greater the value of $\sigma_2$, etc.) in the estimated target distribution. For example, $\sigma_2$ and the target density distribution interval [c, d] may have a second correspondence $\sigma_2$, which is expressed as $(d-c)^2/12$.

Taking the target place as the parking lot as an example, the value of $\mu_2$ may be the midpoint value of the target density distribution interval of the parked vehicles in the parking lot; and the value of $\sigma_2$ may be determined based on the density distribution interval of the parked vehicles in the parking lot, e.g., the processor may determine the value of $\sigma_2$ based on the second correspondence through a maximum value and a minimum value of the density of the parked vehicles.

In some embodiments, the mean value of the second preset distribution may be related to the upper limit of the target density distribution. For example, the mean value $\mu_2$ of the second preset distribution may also be a value of which a distance from the upper limit of the interval [c, d] corresponding to the target density distribution is smaller than a second threshold. The second threshold may be preset. The upper limit of the interval [c, d] corresponding to the target density distribution refers to the maximum value d of the interval. Taking the target place as the parking lot as an example, when the interval corresponding to the density distribution of the parked vehicles is the interval [c, d], and the second threshold is 2, the value of μ2 may be a random value in the interval [d−2, d].

In one or more embodiments of the present disclosure, the second preset distribution may be determined based on the second threshold, and the proportion of the randomly generated training samples with a greater density of targets to be detected may be increased, so that the trained DNN detector may better adapt to target places with denser detection targets.

In some embodiments, the processor may generate a plurality of samples (e.g., greater than 100,000) in one execution, for constructing the simulation data set satisfying the first preset condition.

In some embodiments, the processor 120 may obtain the trained DNN detector by training the initial DNN detector using the simulation data sets determined by the above process as training samples, and the target detection results as labels.

In some embodiments, the processor 120 may output the target detection results by inputting the peak sequences into the trained DNN detector.

In one or more embodiments of the present disclosure, the DNN detector obtained through the training process may better recognize the targets to be detected in the target place and reduce the influence of the interfering targets.

Some embodiments of the present disclosure further relate to a DNN-based multi-target CFAR detection device including a processor configured to perform the DNN-based multi-target CFAR detection method.

Some embodiments of the present disclosure further relate to a non-transitory computer-readable storage medium storing computer instructions. After reading the computer instructions in the storage medium, a computer may perform the DNN-based multi-target CFAR detection method of any of the embodiments.

Those skills in the art can understand that the above descriptions are only preferred examples of the present disclosure, and are not intended to limit the present disclosure. Although the present disclosure has been described in detail with reference to the foregoing examples, those skilled in the art may make modifications to the technical solutions recorded in the foregoing examples, or equivalent replacement of some technical features thereof. All modifications, equivalent replacements, etc. made within the spirit and principles of the embodiments of the present disclosure shall be included in the scope of protection of the present disclosure.

What is claimed is:

1. A deep neural network (DNN)-based multi-target constant false alarm rate (CFAR) detection method, comprising:
    S1: establishing simulation data sets $\{(L_{K_1}^{(1)}, R_{K_1}^{(1)}, I_{K_1}^{(1)}), (L_{K_2}^{(2)}, R_{K_2}^{(2)}, I_{K_2}^{(2)}), \ldots, (L_{K_n}^{(n)}, R_{K_n}^{(n)}, I_{K_n}^{(n)})\}$ for radar intermediate frequency (IF) signals having dynamic signal-to-clutter ratios (SCRs) and a dynamic count of targets through a data augmentation technology, wherein n is a count of training samples, $K_n$ a length of a distance sequence of an nth sample; $L_K$ is a real label, a target is marked as 1, and a clutter is marked as 0; $R = [r_1, r_2, \ldots, r_K]$ is a peak distance sequence, and $I_K = [i_1, i_2, \ldots, i_K]$ is a peak intensity sequence corresponding to $R_K$; and a peak sequence $P_K = (R_K, I_K)$ is obtained by performing Fourier transform on the radar IF signals first, then obtaining a measure X of a radar frequency intensity by modeling, and then taking peak values of X;
    S2: constructing a deep neural network (DNN) detector capable of classifying the peak sequence $P_K$, and training the DNN detector using the simulation data sets to obtain a trained DNN detector;
    S3: taking the peak values of the measure X of the radar frequency intensity to be detected, and inputting the obtained peak sequence $P_K$ into the trained DNN detector to output a target detection result Y;
    S4: assuming that clutters in X obey a Rayleigh distribution, removing the target detection result Y from X to form curtailing samples x̃, and modeling the clutters in x̃ using a truncated Rayleigh distribution; and
    S5: designing a maximum likelihood estimator based on Taylor series to determine approximated maximum likelihood estimation (AMLE) of a proportion parameter σ; and calculating a false alarm adjustment threshold $T_{fa}$ based on a specified false alarm rate $P_{FA}$ and the AMLE of the proportion parameter σ, removing targets of which the detection results Y are lower than $T_{fa}$, and outputting a constant false alarm detection result.

2. The method of claim 1, wherein the data augmentation technology of the simulation data sets includes:
    (1) setting the dynamic SCRs to the radar IF signals, including multiplying an echo signal of a kth target of the radar IF signals corresponding to the simulation data sets by its echo power, $$P_{r,k} = P_c \cdot 10^{\frac{SCR_k}{10}},$$

wherein $P_c$ is a clutter power, and $SCR_k$ is a dynamic SCR set to the kth target $$SCR_k = \overline{SCR} + u.$$

wherein $\overline{SCR}$ is a specified average SCR and set as a random count, so that the training samples have the dynamic SCRs, and u is an SCR variation factor and obeys a Gaussian distribution $N(0, u^2)$; and
    (2) setting the radar IF signals to have the dynamic count of targets by generating a distance sequence based on an additive random sampling manner $$r_k = \begin{cases} r_{k-1} + \tau_k, & k \geq 1 \\ 0, & k = 0 \end{cases},$$

wherein $r_k$ is a distance of the kth target, and $\tau_k$ is a sampling distance interval expressed as:

$$\tau_k = N\left(\frac{D_W}{m}, \mu^2 \frac{D_W^2}{m^2}\right) + s,$$

wherein $D_w$ is a sampling distance window, which is consistent with a ranging range of a radar; μ is a scaling factor; s is a distance variation factor, and obeys a Gaussian distribution $N(0, s^2)$; and m is the count of targets, which is set as a random count to make the training samples have the dynamic count of targets.

3. The method of claim 1, wherein the DNN detector adopts a full connect neural network (FCNN).

4. The method of claim 1, wherein the approximated maximum likelihood estimator based on Taylor series in S5 is expressed as:

$$\hat{\sigma}_{AMLE} = \frac{-b^* + \sqrt{b^{*2} - 8Nc^*}}{4N},$$

wherein, $$b^* = N\alpha[g'(a)a - g(a)]$$

$$c^* = -N\alpha^2 g'(a) - \sum_{i=1}^{N} \tilde{x}_i^2$$

$$g(a) = a\exp(-a^2/2)/[1 - \exp(-a^2/2)]$$

$$a = \alpha/2,$$

wherein, α is a truncation depth.

5. The method of claim 4, wherein the false alarm adjustment threshold $T_{fa}$ is expressed as:

$$T_{fa} = \sqrt{-2\hat{\sigma}_{AMLE}^2 \log P_{FA}}.$$

* * * * *